United States Patent
Chou et al.

(10) Patent No.: US 9,977,441 B2
(45) Date of Patent: May 22, 2018

(54) LOW DROPOUT REGULATOR AND RELATED METHOD

(71) Applicant: Taiwan Semiconductor Manufacturing Company, Ltd., Hsin-Chu (TW)

(72) Inventors: Chung-Cheng Chou, Hsin-Chu (TW); Po-Hao Lee, Hsin-Chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 2 days.

(21) Appl. No.: 15/093,211

(22) Filed: Apr. 7, 2016

(65) Prior Publication Data

US 2016/0224039 A1 Aug. 4, 2016

Related U.S. Application Data

(63) Continuation of application No. 14/080,238, filed on Nov. 14, 2013, now Pat. No. 9,323,259.

(51) Int. Cl.
| | |
|---|---|
| *G05F 1/46* | (2006.01) |
| *G05F 1/575* | (2006.01) |
| *H02M 1/12* | (2006.01) |
| *H02M 3/338* | (2006.01) |

(52) U.S. Cl.
CPC ............... *G05F 1/468* (2013.01); *G05F 1/46* (2013.01); *G05F 1/575* (2013.01); *H02M 1/12* (2013.01); *H02M 3/3382* (2013.01)

(58) Field of Classification Search
CPC . G05F 1/46; G05F 1/468; G05F 1/575; G05F 1/56; G05F 1/565; G05F 1/573; G05F 1/10; G05F 1/461; G05F 1/462; G05F 3/262; G05F 3/30; G05F 1/563; G05F 1/577; G05F 1/59; G05F 1/595; G05F 1/613; G05F 3/26; H02M 1/12; H02M 3/3382

See application file for complete search history.

(56) References Cited

U.S. PATENT DOCUMENTS

| | | |
|---|---|---|
| 6,097,237 A | 8/2000 | Singh |
| 6,433,624 B1 | 8/2002 | Grossnickle et al. |
| 7,425,867 B2 * | 9/2008 | Aemireddy ........... H03F 3/4521 330/257 |

(Continued)

*Primary Examiner* — Fred E Finch, III
*Assistant Examiner* — Demetries A Gibson
(74) *Attorney, Agent, or Firm* — Slater Matsil, LLP

(57) ABSTRACT

A device is configured to provide low dropout regulation. An amplifier stage includes a first transistor electrically connected to an output of the device, and a second transistor. A current mirror includes a third transistor electrically connected to the second transistor, and a fourth transistor electrically connected to the third transistor. The auxiliary current source has a control terminal electrically connected to a gate electrode of the fourth transistor. The pull down stage includes a fifth transistor having a gate electrode electrically connected to a drain electrode of the first transistor, and a sixth transistor having a gate electrode electrically connected to the gate electrode of the fourth transistor. The pull up transistor has a gate electrode electrically connected to a drain electrode of the fifth transistor. The first capacitor has a first terminal electrically connected to the gate electrode of the first transistor.

20 Claims, 6 Drawing Sheets

(56) References Cited

U.S. PATENT DOCUMENTS

| | | | |
|---|---|---|---|
| 8,598,854 B2 | 12/2013 | Soenen et al. | |
| 8,629,694 B1 | 1/2014 | Wang et al. | |
| 8,629,706 B2 | 1/2014 | Chen et al. | |
| 8,816,670 B2 | 8/2014 | Lee et al. | |
| 8,947,069 B2 * | 2/2015 | Fort | G05F 3/30 323/313 |
| 8,963,641 B1 * | 2/2015 | Liu | H03F 3/4508 330/260 |
| 2006/0107245 A1 | 5/2006 | Chakraborty et al. | |
| 2006/0192538 A1 | 8/2006 | Wang et al. | |
| 2006/0244498 A1 * | 11/2006 | Kohout | H03K 17/166 327/134 |
| 2007/0063686 A1 | 3/2007 | Yamada | |
| 2009/0174433 A1 * | 7/2009 | Pasqualini | H03K 19/018521 326/73 |
| 2009/0179622 A1 | 7/2009 | Ivanov et al. | |
| 2010/0188385 A1 * | 7/2010 | Boiko | G11C 19/184 345/211 |
| 2012/0126763 A1 | 5/2012 | Yang | |
| 2012/0176186 A1 | 7/2012 | Chen et al. | |
| 2013/0051583 A1 * | 2/2013 | Gueorguiev | H02M 3/073 381/111 |
| 2013/0241510 A1 | 9/2013 | Shi et al. | |
| 2013/0307516 A1 | 11/2013 | Horng et al. | |
| 2013/0320944 A1 | 12/2013 | Siao | |
| 2014/0002041 A1 | 1/2014 | Soenen et al. | |
| 2014/0117950 A1 * | 5/2014 | Ng | G05F 1/575 323/265 |
| 2014/0266114 A1 | 9/2014 | Chern et al. | |

* cited by examiner

LOW DROPOUT REGULATOR AND RELATED METHOD

This application is a continuation of U.S. patent application Ser. No. 14/080,238, filed on Nov. 14, 2013, and entitled "Low Dropout Regulator and Related Method," which application is incorporated herein by reference.

BACKGROUND

The semiconductor industry has experienced rapid growth due to improvements in the integration density of a variety of electronic components (e.g., transistors, diodes, resistors, capacitors, etc.). For the most part, this improvement in integration density has come from shrinking the semiconductor process node (e.g., shrinking the process node towards the sub-20 nm node). Commensurate with shrunken dimensions is an expectation of greater immediacy (higher speed) and increased performance with reduced power consumption. A low-dropout (LDO) regulator is a voltage regulator that introduces a small difference between input voltage and output voltage. Performance of the LDO is described at least by drop-out voltage, standby current, size, and speed.

BRIEF DESCRIPTION OF THE DRAWINGS

For a more complete understanding of the present embodiments, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely low dropout (LDO) regulators and methods with beneficial area and speed. Other embodiments may also be applied, however, to other types of integrated devices.

Throughout the various figures and discussion, like reference numbers refer to like objects or components. Also, although singular components may be depicted throughout some of the figures, this is for simplicity of illustration and ease of discussion. A person having ordinary skill in the art will readily appreciate that such discussion and depiction can be and usually is applicable for many components within a structure.

Integrated LDO regulators have many and various uses in integrated circuit (IC) applications. LDO regulators are rated in terms of performance metrics, including drop-out voltage, standby current, load regulation, line regulation, maximum current, speed (responsiveness in the presence of varying loads), and output voltage variations (e.g., undershoot and overshoot) due to transients in load current, among others.

In the following disclosure, novel LDO regulators are introduced. The LDO regulators use an adaptive dynamic bias current to provide area efficiency, and high speed.

Figure 1:
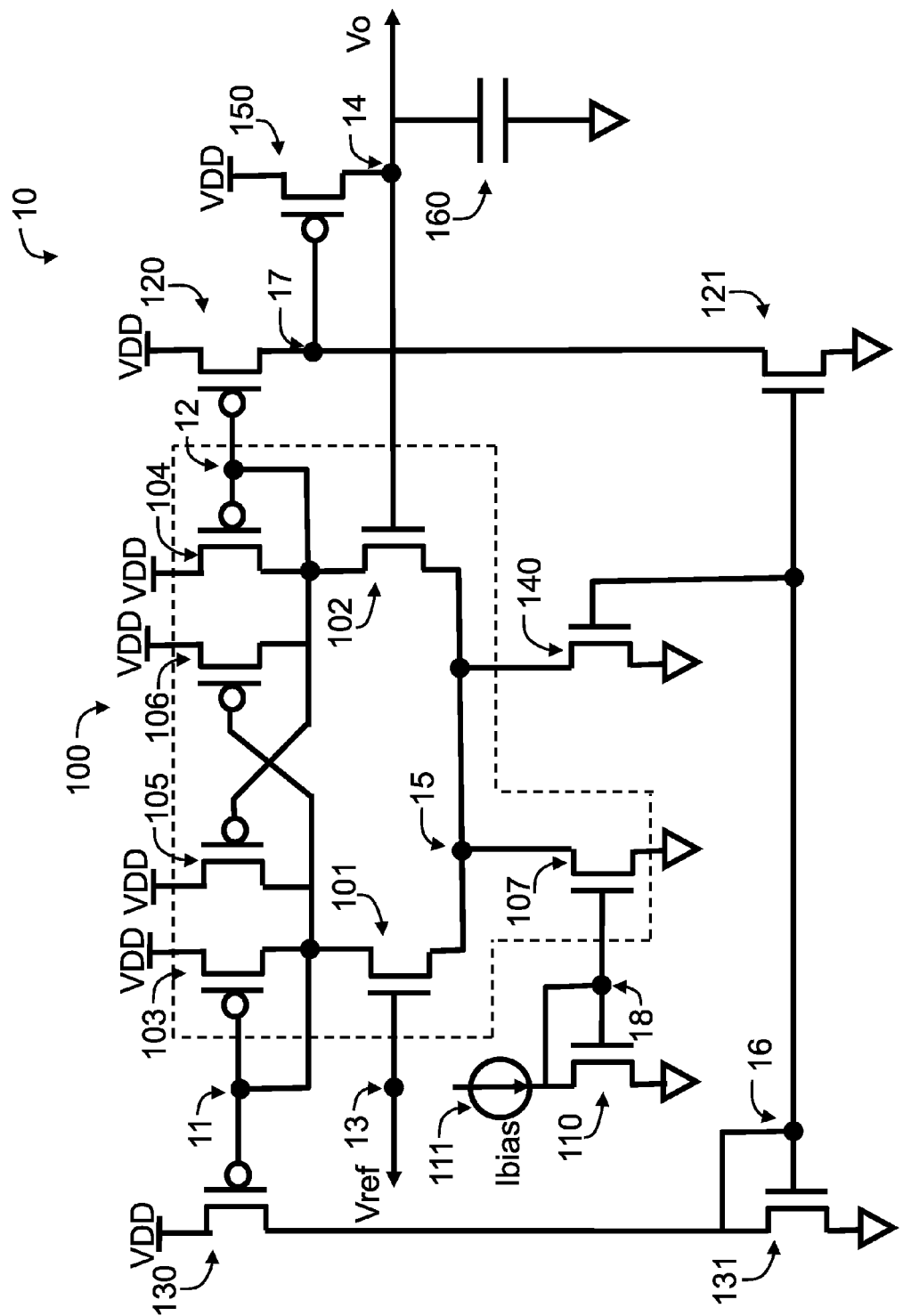
FIG. 1 is a diagram showing a low-dropout regulator (LDO) in accordance with various embodiments of the present disclosure.

FIG. 1 is a diagram showing a low-dropout regulator (LDO) 10 in accordance with various embodiments of the present disclosure. Transistors 101, 102 are a differential pair of an amplifier stage 100. A gate electrode of the transistor 101 is electrically biased by a reference voltage Vref at a node 13. A gate electrode of the transistor 102 is electrically connected to a node 14. The node 14 has voltage level equal to output voltage Vo of the LDO 10. Source electrodes of the transistors 101, 102 are electrically connected to a drain electrode of a transistor 107 (node 15). The transistor 107 provides direct current (DC) current to the amplifier stage 100. A drain electrode of the transistor 101 is electrically connected to a node 11, and a drain electrode of the transistor 102 is electrically connected to a node 12. In some embodiments, the transistors 101, 102, 107 are N-type metal-oxide-semiconductor (NMOS) transistors.

A source electrode of the transistor 107 is electrically connected to a second voltage supply node that supplies a second voltage (e.g., ground). A gate electrode of the transistor 107 is electrically connected to a gate electrode (node 18) of a transistor 110. In some embodiments, the transistor 110 is an NMOS transistor. A drain electrode of the transistor 110 is electrically connected to a current supply 111 that supplies bias current Ibias. A source electrode of the transistor 110 is electrically connected to the second voltage supply node.

Transistors 103, 104 are active loads electrically connected to the transistors 101, 102, respectively. A drain electrode of the transistor 103 is electrically connected to the drain electrode of the transistor 101. A gate electrode of the transistor 103 is electrically connected to the drain electrode of the transistor 103. A source electrode of the transistor 103 is electrically connected to a first voltage supply node that supplies a first voltage VDD.

A drain electrode of the transistor 104 is electrically connected to the drain electrode of the transistor 102. A gate electrode of the transistor 104 is electrically connected to the drain electrode of the transistor 104. A source electrode of the transistor 104 is electrically connected to the first voltage supply node. In some embodiments, the transistors 103, 104 are P-type metal-oxide-semiconductor (PMOS) transistors.

Transistors 120, 121 are a second amplifier stage electrically connected to the node 12. In some embodiments, the transistor 120 is a PMOS transistor, and the transistor 121 is an NMOS transistor. A source electrode of the transistor 120 is electrically connected to the first voltage supply node. A gate electrode of the transistor 120 is electrically connected to the node 12. A drain electrode of the transistor 120 is electrically connected to a node 17.

A source electrode of the transistor 121 is electrically connected to the second voltage supply node. A gate electrode of the transistor 121 is electrically connected to a node 16. A drain electrode of the transistor 121 is electrically connected to the node 17 (the drain electrode of the transistor 120).

Transistors 130, 131 are a current mirror electrically connected to the node 11, the second amplifier stage, and a secondary bias current source 140. In some embodiments, the transistor 130 is a PMOS transistor, and the transistor 131 is an NMOS transistor. A source electrode of the transistor 130 is electrically connected to the first voltage supply node. A gate electrode of the transistor 130 is electrically connected to the node 11. A drain electrode of the transistor 130 is electrically connected to a drain electrode of the transistor 131. A gate electrode of the transistor 131 is electrically connected to the drain electrode of the transistor 131. The gate electrode of the transistor 131 is further electrically connected to the gate electrode of the transistor 121. A source electrode of the transistor 131 is electrically connected to the second voltage supply node. The transistor 131 is diode-connected.

In some embodiments, the secondary bias current source 140 (or "transistor 140") is an NMOS transistor. A drain electrode of the transistor 140 is electrically connected to the source electrodes of the transistors 101, 102 (node 15). A gate electrode of the transistor 140 is electrically connected to the gate electrode of the transistor 131 (node 16). A source electrode of the transistor 140 is electrically connected to the second voltage supply node.

A transistor 150 is a buffer stage electrically connected to the transistor 120 and the node 14 corresponding to the output of the LDO 10. In some embodiments, the transistor 150 is a PMOS transistor. A source electrode of the transistor 150 is electrically connected to the first voltage supply node. A gate electrode of the transistor 150 is electrically connected to the drain electrode of the transistor 120 (node 17). A drain electrode of the transistor 150 is electrically connected to gate electrode of the transistor 102 (node 14).

A capacitor 160 is electrically connected to the node 14 corresponding to the output of the LDO 10. In some embodiments, the capacitor 160 is a polysilicon capacitor, a metal-oxide-metal capacitor, a metal-insulator-metal capacitor, or another such integrated capacitor. In some embodiments, the capacitor 160 is an external capacitor. A first electrode of the capacitor 160 is electrically connected to the gate electrode of the transistor 102 (node 14). A second electrode of the capacitor 160 is electrically connected to the second voltage supply node.

In some embodiments, the amplifier stage 100 further includes transistors 105, 106, which establish positive feedback in the amplifier stage 100 during normal operation. A source electrode of the transistor 105 is electrically connected to the first voltage supply node. A gate electrode of the transistor 105 is electrically connected to the drain electrodes of the transistors 102, 104 (node 12). A drain electrode of the transistor 105 is electrically connected to the drain electrodes of the transistors 101, 103 (node 11).

A source electrode of the transistor 106 is electrically connected to the first voltage supply node. A gate electrode of the transistor 106 is electrically connected to the drain electrodes of the transistors 101, 103 (node 11). A drain electrode of the transistor 106 is electrically connected to the drain electrodes of the transistors 102, 104 (node 12).

In normal operation, the transistor 107 (M1) mirrors the bias current Ibias to power the transistors 101-106 of the amplifier stage 100. The output voltage Vo is established at the node 14 by the transistor 150 and the capacitor 160. Driving strength of the transistor 150 is dependent on source-gate voltage VSG (voltage between VDD and the node 17) of the transistor 150. Voltage at the node 17 is determined by relative strength or weakness of current driving of the transistor 120 versus the transistor 121. When the transistor 120 is turned on more strongly than the transistor 121, the voltage at the node 17 is pulled more strongly toward a first supply voltage (VDD) of the first power supply node. When the transistor 121 is turned on more strongly than the transistor 120, the voltage at the node 17 is pulled more strongly toward a second supply voltage (e.g., ground) of the second power supply node. To raise the output voltage Vo, the voltage at the node 17 may be lowered to increase driving strength (drain current) of the transistor 150. To lower the output voltage Vo, the voltage at the node 17 may be increased to reduce the driving strength of the transistor 150.

The amplifier stage 100 compares the output voltage Vo with the reference voltage Vref. A dip (undershoot) in the output voltage Vo lowers driving strength (drain current) of the transistor 102 (M4) relative to the transistor 101 (M3). The dip may occur when current drawn from the LDO 10 increases suddenly or sharply (e.g., when a large number of devices supplied from the LDO 10 are turned on). Due to the lowered driving strength of the transistor 102, current flowing through the transistors 102, 104, 106 is lowered, and current flowing through the transistors 101, 103, 105 is raised. The transistor 120 mirrors the drain current of the transistor 102, and the transistor 130 mirrors the drain current of the transistor 103. The mirrored drain current that flows through the transistors 130, 131 is mirrored again by the transistor 121. The dip in the output voltage Vo is thus sensed by the amplifier stage 100, and fed back to the transistor 121 to lower the voltage of the node 17. A feedback path for controlling the output voltage Vo includes the transistors 102, 101, and 130. The lowered voltage at the node 17 strengthens the drain current driven by the transistor 150 to pull the output voltage back up toward the reference voltage Vref. The reverse mechanism pulls down the output voltage Vo when a rise (overshoot) occurs in the output voltage Vo. The rise strengthens driving of the transistor 120 through the transistors 102, 104, 106, and weakens driving of the transistor 121 through the feedback path. The voltage at the node 17 is pulled up under these conditions, which reduces rate of charge fed to the capacitor 160 by the transistor 150, and lowers the output voltage Vo as current is drawn from the LDO 10 by circuits electrically connected to the LDO 10.

The transistor 140 speeds up response time of the amplifier stage 100 during an undershoot event. When undershoot occurs, the drain current of the transistor 103 is increased. The drain current of the transistor 103 is mirrored by the transistor 130. The voltage at the node 16 is increased due to the increased mirror current (the drain current of the transistor 130) flowing through the transistor 131 (M11). Increasing the voltage at the node 16 increases gate-source voltage (VGS) of the transistor 140. The increased VGS of the transistor 140 turns on the transistor 140 more strongly to supply higher current to the amplifier stage 100. As a result, the voltage at the node 16 is pulled up more rapidly, which pulls down the voltage at the node 17 more rapidly, and pulls up the output voltage Vo more rapidly.

In some embodiments, the amplifier stage 100 of the LDO further comprises the transistors 105, 106. The transistors 105, 106 are cross-coupled, and provide positive feedback in the amplifier stage 100 to further speed up the response time of the amplifier stage 100. Source electrodes of the transistors 105, 106 are electrically connected to the first voltage supply node. A gate electrode of the transistor 105 is electrically connected to the drain electrodes of the transistors 102, 104, 106. A gate electrode of the transistor 106 is electrically connected to the drain electrodes of the transistors 101, 103, 105.

In an undershoot event, the voltage at the node 12 is raised, and the voltage at the node 11 is lowered. The lowered voltage at the node 11 strengthens current driving of the transistor 106, which serves to enhance pulling up of the voltage 12 toward the first voltage VDD. The raised voltage at the node 12 weakens current driving of the transistor 105, which allows the voltage at the node 11 to be pulled down by the transistor 101 more rapidly.

In some embodiments, the LDO 10 includes the transistor 140 and the transistors 130, 131. In some embodiments, the LDO 10 includes the transistors 105, 106. In some embodiments, the LDO includes the transistors 105, 106, and the transistors 130, 131, 140. The auxiliary current source 140 and the cross-coupled transistors 105, 106 speed up recovery time of the LDO 10 in undershoot events.

Figure 2:
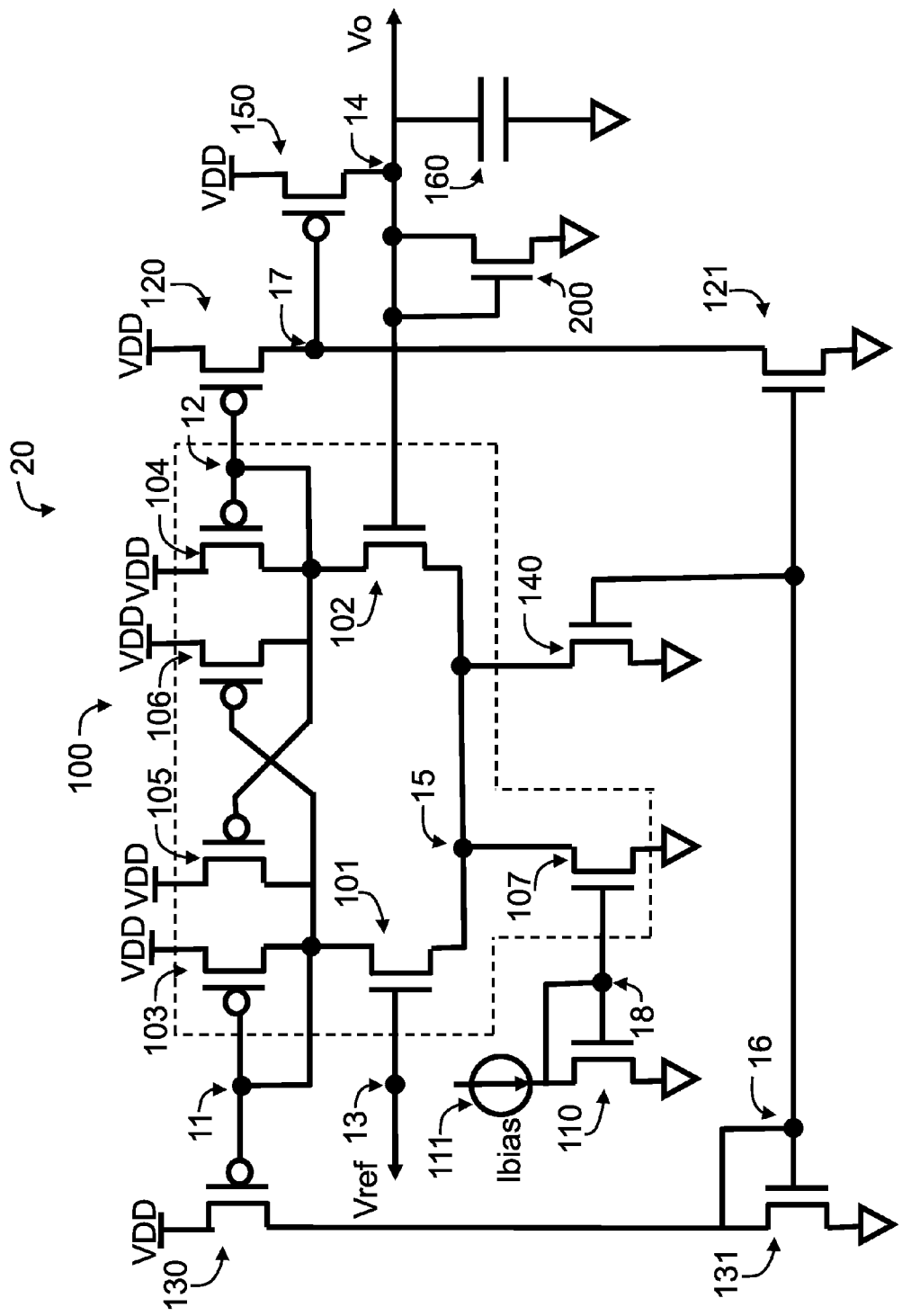
FIG. 2 is a diagram showing an LDO in accordance with various embodiments of the present disclosure.

FIG. 2 is a diagram showing an LDO 20 in accordance with various embodiments of the present disclosure. The LDO 20 is similar in many aspects to the LDO 10 of FIG. 1, and like reference numerals indicate like components. The LDO 20 further comprises a transistor 200. In some embodiments, the transistor 200 is an NMOS transistor. In some embodiments, the transistor 200 is a diode-connected transistor. Drain and gate electrodes of the transistor 200 are electrically connected to the node 14 corresponding to the output of the LDO 20. A source electrode of the transistor 200 is electrically connected to the second voltage supply node. The transistor 200 may be considered a pull down device.

Figure 3:
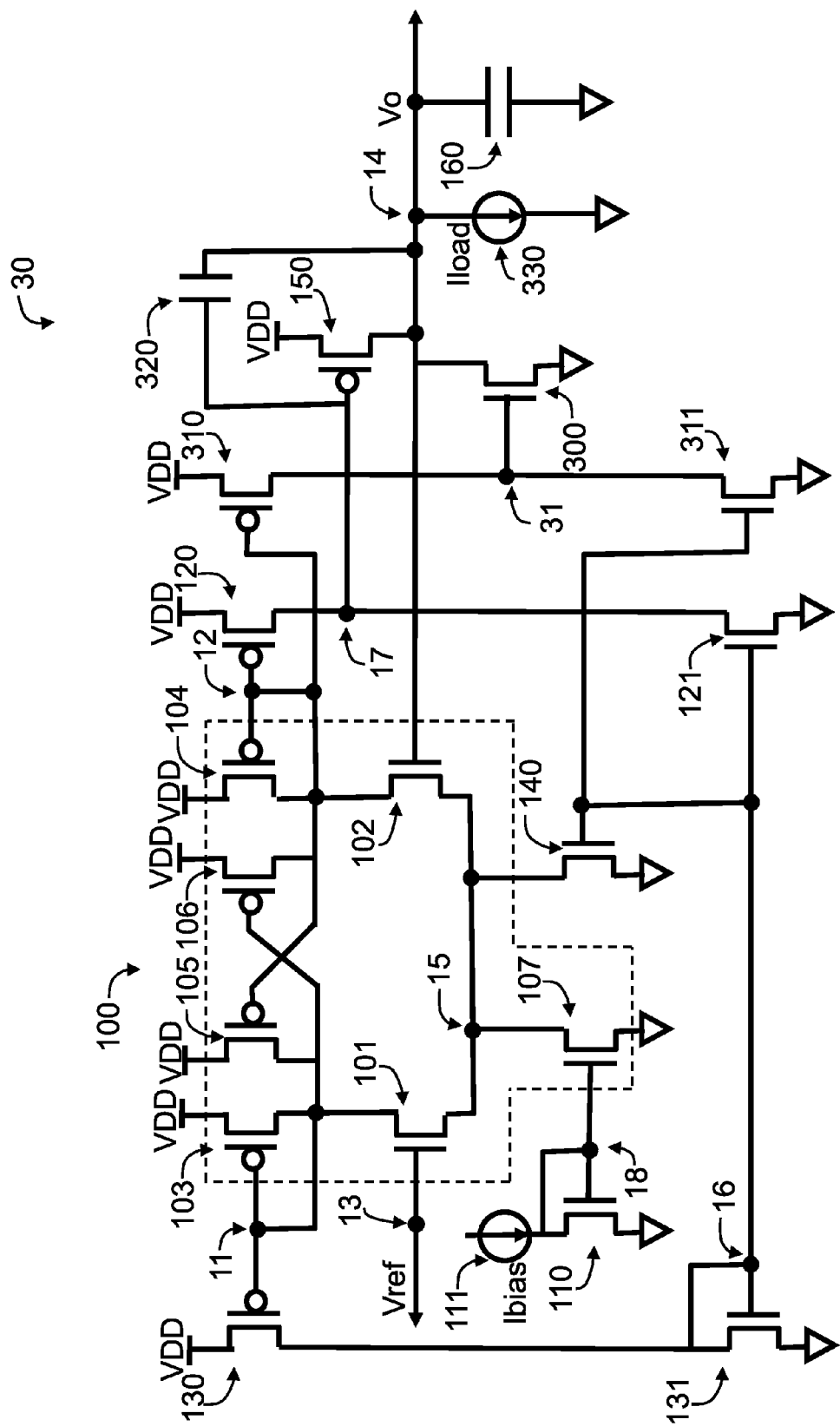
FIG. 3 is a diagram showing an LDO in accordance with various embodiments of the present disclosure.

FIG. 3 is a diagram showing an LDO 30 in accordance with various embodiments of the present disclosure. The LDO 30 is similar in many aspects to the LDO 10 of FIG. 1, and like reference numerals indicate like components. In some embodiments, the LDO 30 includes a pull up stage and a pull down stage. At least the transistors 120, 121 and 150 form the pull up stage. The pull up stage may act to pull up the output voltage Vo at the node 14. At least transistors 300, 310, and 311 form the pull down stage. The pull down stage may act to pull down the output voltage Vo at the node 14. In some embodiments, the transistor 310 is a PMOS transistor, and the transistors 311, 300 are NMOS transistors.

Operation of the transistors 120, 121, 150 of the pull up stage is described above in the related description of FIG. 1. The transistors 120, 121 determine the voltage at the node 17 based on relative driving strengths of the transistors 120, 121. The voltage at the node 17 controls driving strength of the transistor 150, which acts to pull up the voltage at the node 14 toward the first voltage VDD.

In the pull down stage, the transistor 310 and the transistor 311 are connected to the nodes 12 and 16, respectively. A source electrode of the transistor 310 is electrically connected to the first voltage supply node. A gate electrode of the transistor 310 is electrically connected to the node 12. A drain electrode of the transistor 310 is electrically connected to a gate electrode of the transistor 300 (node 31).

A source electrode of the transistor 311 is electrically connected to the second voltage supply node. A gate electrode of the transistor 311 is electrically connected to the node 16. A drain electrode of the transistor 311 is electrically connected to the gate electrode of the transistor 300 (node 31).

The gate electrode of the transistor 300 is electrically connected to the drain electrodes of the transistors 310, 311. A drain electrode of the transistor 300 is electrically connected to the node 14 corresponding to the output of the LDO 30. A source electrode of the transistor 300 is electrically connected to the second voltage supply node.

The LDO 30 further includes a capacitor 320. A first electrode of the capacitor 320 is electrically connected to the node 14. A second electrode of the capacitor 320 is electrically connected to the node 17.

In operation, the pull down stage acts to pull down the output voltage Vo at the node 14. In an overshoot event, when the output voltage Vo is pulled up above the reference voltage Vref, the transistor 102 turns on more strongly. The voltage at the node 12 is pulled down by the transistor 102. The voltage at the node 11 is pulled up at least by current swing away from the transistor 101. The drain current of the transistor 130 is lowered by the raised voltage at the node 11. The voltage at the node 16 is lowered by the lowered drain current of the transistor 130 and the transistor 131. The transistor 311 is turned on more weakly by the lowered voltage at the node 16. The transistor 310 is turned on more strongly by the lowered voltage at the node 12. The voltage at the node 31 is pulled more strongly up toward the first voltage VDD by the strongly turned on transistor 310 and the weakly turned on transistor 311. The transistor 300 is turned on more strongly by the higher voltage at the node 31. As a result, the output voltage Vo is pulled down by negative feedback just described in response to the overshoot event.

The capacitor 320 speeds up response time during undershoot events. When the output voltage Vo is pulled down below the reference voltage Vref, capacitive coupling of the capacitor 320 pushes down voltage at the node 17 corresponding to the gate electrode of the transistor 150. The transistor 150 turns on more strongly by the lowered voltage at the node 17, and drives greater current to pull the output voltage Vo back up toward the first voltage VDD. In overshoot events, the capacitor 320 may further speed up recovery by pulling up the voltage at the node 17. The transistor 150 is turned on less strongly by the increased voltage at the node 17 (source-gate voltage VSG is smaller).

Transistor drain current is proportional to width, length, carrier mobility, and other parameters of the transistor. To increase drain current, a transistor may be designed to have larger width. To decrease drain current, a transistor may be designed to have smaller width. In some embodiments, the transistors 104, 120, 310, 131, 121, 311 have the same dimensions (e.g., width, width/length ratio, or the like). In some embodiments, at least one of the transistors 104, 120, 310, 131, 121, 311 has different dimensions than others of the transistors 104, 120, 310, 131, 121, 311. For example, in some embodiments, the transistor 120 is larger than the transistor 121. In some embodiments, the transistor 311 is larger than the transistor 310. The transistor 120 may dominate in determining the voltage at the node 17. And, the transistor 311 may dominate in determining the voltage at the node 31. In some embodiments, the transistor 104 has substantially the same size as the transistor 131. In some embodiments, the transistor 104 has substantially the same driving capability as the transistor 131 (carrier mobility being higher for NMOS transistors than PMOS transistors indicates that width of the transistor 104 may be larger than width of the transistor 131 to achieve similar driving capability).

In some embodiments, the transistor 130 is smaller than the transistor 103. For example, width of the transistor 130 may be half the width of the transistor 103. In this type of configuration, the drain current resulting from current mirroring by the transistor 130 may be about half the drain current of the transistor 103. The transistors 103, 104, 120 and 310 may have substantially the same width. The transistor 121 in the pull up stage may have smaller width than the transistor 311 in the pull down stage.

The LDOs 10, 20, 30 of FIGS. 1-3 provide substantial area savings in size of the capacitor 160. Compared to other approaches that do not include the transistor 140, the transistors 105, 106, or the pull up and pull down stages, the capacitor 160 (or, "output capacitor") of the LDOs 10, 20, 30 is very small. The other approaches may require on the order of hundreds of picofarads to single microfarads of capacitance in the output capacitor. In many of the other approaches, the output capacitor is an external, discrete capacitor not integrated into a single integrated circuit (IC) chip. The capacitor 160 of the LDOs 10, 20, 30 may have size on the order of single picofarads, and is easily integrated with the LDO 10, 20, or 30 in a single IC chip.

Figure 4:
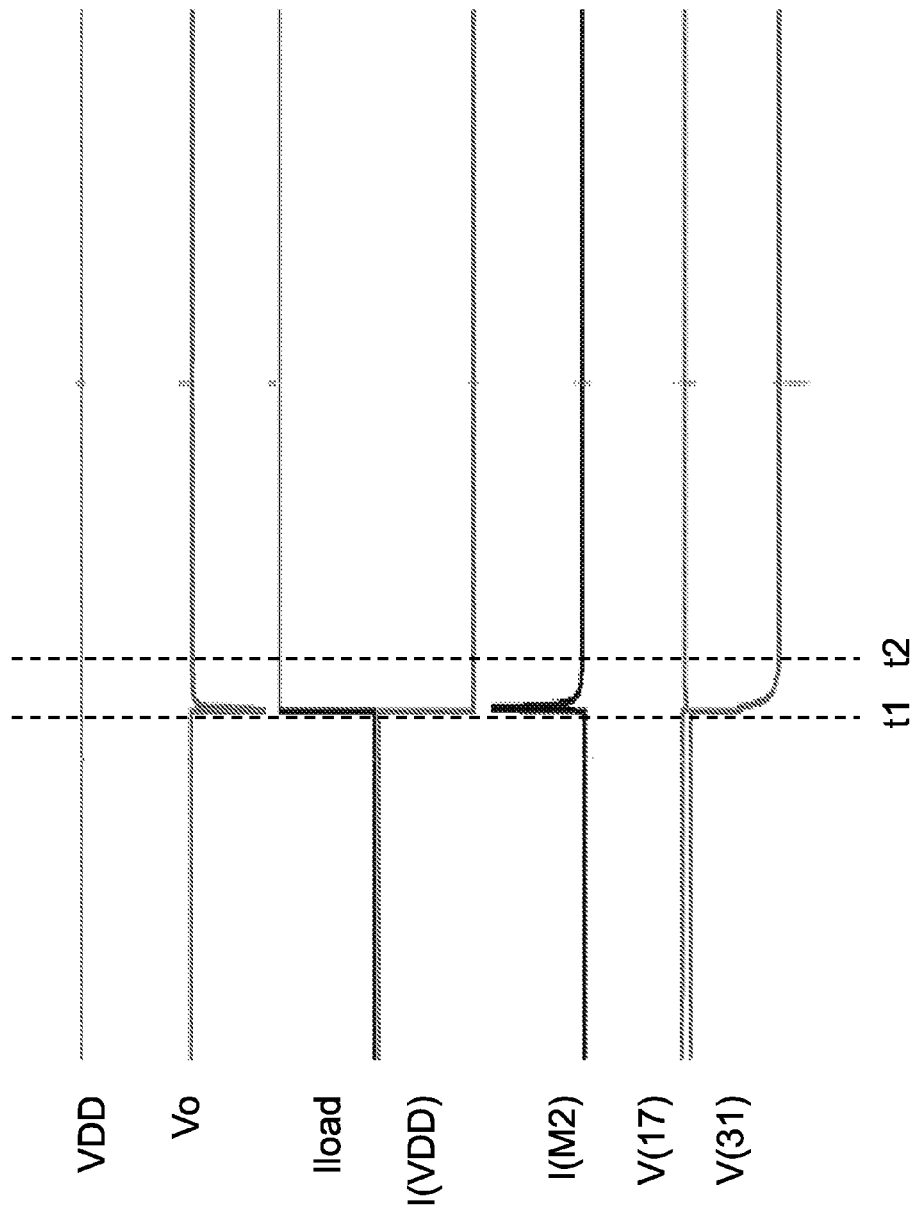
FIG. 4 is a waveform diagram of the LDO of FIG. 3 in accordance with various embodiments of the present disclosure.

FIG. 4 is a waveform diagram of the LDO 30 of FIG. 3 in accordance with various embodiments of the present disclosure. In the waveform diagram, a transient is applied at a time t1 to simulate a sharp increase in a load current Iload provided by the LDO 30. The output voltage Vo dips sharply in response to the transient. Current of the transistor 140 (M2) spikes due to the feedback path (through the transistors 102, 103, 130, 131) described in relation to FIG. 1. The voltage V(17) at the node 17 drops rapidly, and the output voltage Vo recovers almost immediately with little-to-no overshoot.

Figure 5:
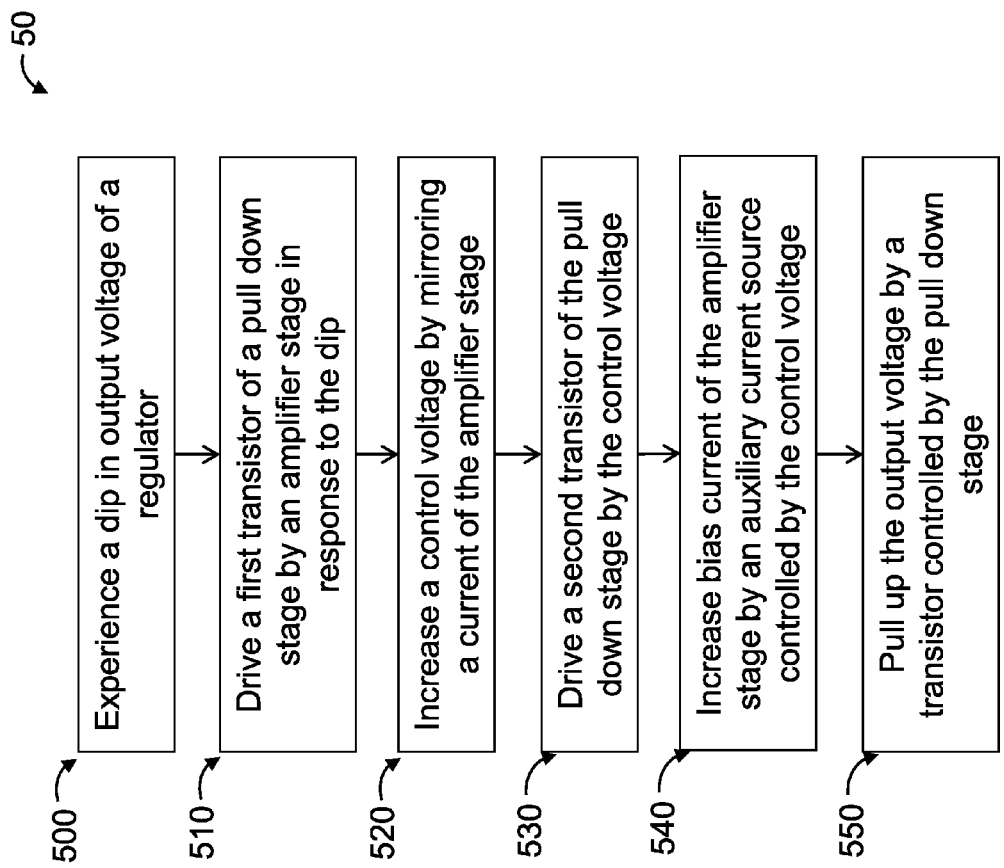
FIG. 5 is a flowchart of a method for regulating voltage in accordance with various embodiments of the present disclosure.

FIG. 5 is a flowchart of a method 50 for regulating voltage in accordance with various embodiments of the present disclosure. In some embodiments, the method 50 is performed by the LDO 10, 20, or 30. The method 50 is described with reference to, for example, FIG. 3, but is not limited to being performed by the LDO 30. The method 50 may be performed by other regulator circuits in other embodiments.

A dip in the output voltage Vo of the LDO 30 is experienced 500. In some embodiments, the dip is experienced by the transistor 102 of the amplifier stage 100. In some embodiments, the dip is a drop in the output voltage Vo to a level below the reference voltage Vref. A first transistor (e.g., the transistor 120) of the pull down stage is driven 510 by the amplifier stage 100 in response to the dip. In some embodiments, the first transistor is driven by mirroring drain current of a load transistor of the amplifier stage 100. For example, the load transistor may be the transistor 104.

A control voltage is increased 520 by mirroring a current of the amplifier stage 100. For example, the current mirrored may be the drain current of the transistor 103. In some embodiments, the control voltage is increased 520 by mirroring the current to a diode-connected transistor (e.g., the transistor 131) by the transistor 130. In some embodiments, the control voltage is the voltage at the node 16.

A second transistor (e.g., the transistor 121) of the pull down stage is driven 530 by the control voltage (e.g., the voltage at the node 16). In some embodiments, the second transistor is driven more strongly than the first transistor. In some embodiments, the second transistor has higher drain current than the first transistor. Bias current of the amplifier stage 100 is increased 540 by an auxiliary current source (e.g., the transistor 140) controlled by the control voltage (e.g., the voltage at the node 16).

The output voltage (e.g., the output voltage Vo) is pulled up 550 by a transistor (e.g., the transistor 150) controlled by the pull down stage. In some embodiments, the method 50 further includes providing positive feedback to the amplifier stage by a cross-coupled pair of transistors (e.g., the transistors 105, 106).

Figure 6:
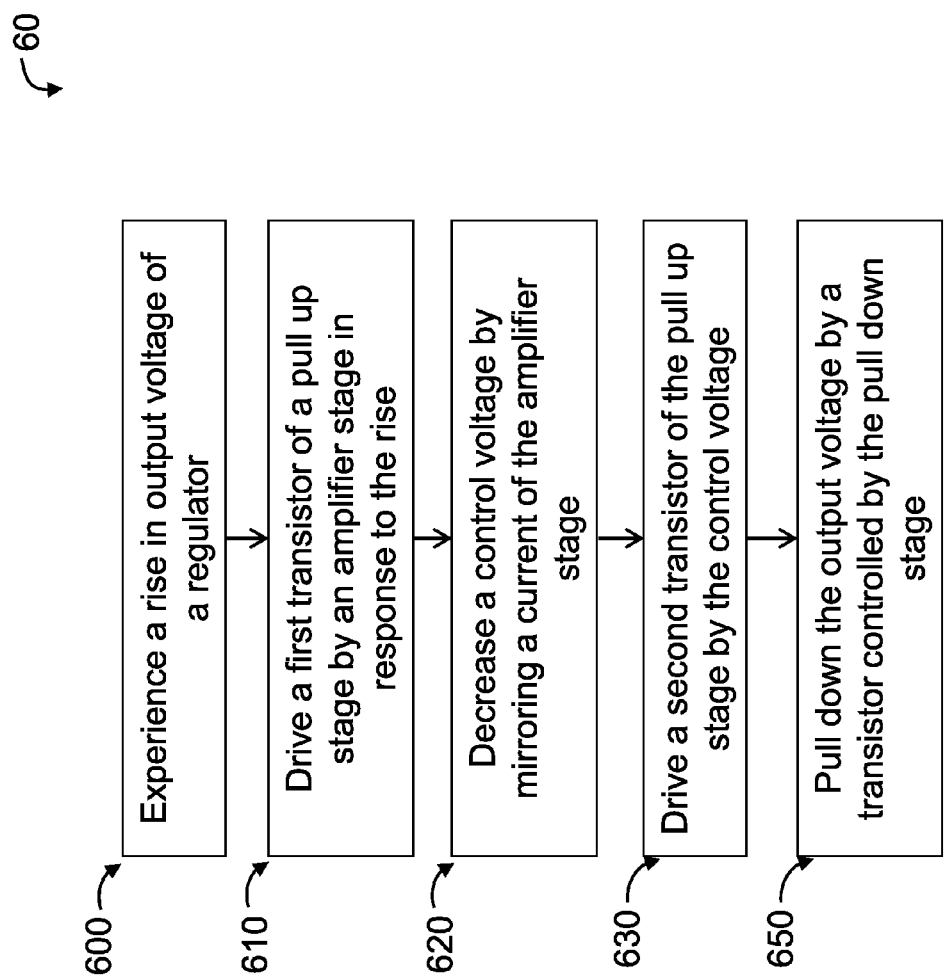
FIG. 6 is a flowchart of a method for regulating voltage in accordance with various embodiments of the present disclosure.

FIG. 6 is a flowchart of a method 60 for regulating voltage in accordance with various embodiments of the present disclosure. In some embodiments, the method 60 is performed by the LDO 10, 20, or 30. The method 60 is described with reference to, for example, FIG. 3, but is not limited to being performed by the LDO 30. The method 60 may be performed by other regulator circuits in other embodiments.

A rise in the output voltage Vo of the LDO 30 is experienced 600. In some embodiments, the rise is experienced by the transistor 102 of the amplifier stage 100. In some embodiments, the rise is an increase in the output voltage Vo to a level above the reference voltage Vref. A first transistor (e.g., the transistor 310) of the pull up stage is driven 610 by the amplifier stage 100 in response to the rise. In some embodiments, the first transistor is driven by mirroring drain current of a load transistor of the amplifier stage 100. For example, the load transistor may be the transistor 104.

A control voltage is decreased 620 by mirroring a current of the amplifier stage 100. For example, the current mirrored may be the drain current of the transistor 103. In some embodiments, the control voltage is decreased 620 by mirroring the current to a diode-connected transistor (e.g., the transistor 131) by the transistor 130. In some embodiments, the control voltage is the voltage at the node 16.

A second transistor (e.g., the transistor 311) of the pull up stage is driven 630 by the control voltage (e.g., the voltage at the node 16). In some embodiments, the first transistor is driven more strongly than the second transistor. In some embodiments, the first transistor has higher drain current than the second transistor.

The output voltage (e.g., the output voltage Vo) is pulled down 650 by a transistor (e.g., the transistor 300) controlled by the pull down stage. In some embodiments, the method 60 further includes providing positive feedback to the amplifier stage by a cross-coupled pair of transistors (e.g., the transistors 105, 106).

Embodiments may achieve advantages. The capacitor 160 can be very small and integrated into a single IC chip with other semiconductor devices of the LDO regulator 10, 20, or 30. The LDO regulators 10, 20, and 30 have very fast response time, due to at least the transistor 140, and the transistors 105, 106. Standby current of the LDOs 10, 20, and 30 is low, and dropout is also low.

In accordance with various embodiments of the present disclosure, a device includes an amplifier stage, a current mirror, an auxiliary current source, a pull down stage, a pull up transistor, and a first capacitor. The amplifier stage includes a first transistor having a control terminal electrically connected to an output of the device, and a second transistor. The current mirror includes a third transistor having a gate electrode electrically connected to a gate electrode of the second transistor, and a fourth transistor having a drain electrode electrically connected to a drain electrode of the third transistor. The auxiliary current source has a control terminal electrically connected to a gate electrode of the fourth transistor. The pull down stage includes a fifth transistor having a gate electrode electrically connected to a drain electrode of the first transistor, and a sixth transistor having a gate electrode electrically connected to the gate electrode of the fourth transistor. The pull up transistor has a gate electrode electrically connected to a drain electrode of the fifth transistor. The first capacitor has a first terminal electrically connected to the gate electrode of the first transistor.

In accordance with various embodiments of the present disclosure, a method includes: (a) receiving a dip in an output voltage of a regulator; (b) driving a first transistor of a pull down stage by an amplifier stage in response to the dip; (c) increasing a control voltage by mirroring a current of the amplifier stage; (d) driving a second transistor of the pull down stage by the control voltage; (e) increasing bias current of the amplifier stage by an auxiliary current source controlled by the control voltage; and (f) pulling up the output voltage by a transistor controlled by the pull down stage.

In accordance with various embodiments of the present disclosure, a method includes: (a) comparing an output voltage of a low dropout regulator (LDO) with a reference voltage by an amplifier stage; (b) generating a first current and a second current by the amplifier stage according to a comparison result of (a); (c) mirroring the first current by a first transistor of a second stage to generate a first mirrored current; (d) mirroring the second current by a current mirror to generate a second mirrored current; (e) generating a control voltage according to the second mirrored current; (f) biasing an auxiliary current source of the amplifier stage by the control voltage; (g) mirroring the second mirrored current by a second transistor of the second stage to generate a third mirrored current; and (h) adjusting the output voltage to approach the reference voltage by a transistor controlled by the second stage.

In accordance with various embodiments, a device includes an amplifier stage electrically connected to an output of the device and to a reference voltage. A current mirror is electrically connected to the amplifier stage. An auxiliary current source having a control terminal is electrically connected to the current mirror. The device includes a pull down stage. including a first transistor having a gate terminal electrically connected to the amplifier stage, and a second transistor having a gate terminal electrically connected to the current mirror. The device also includes a pull up transistor having a gate terminal electrically connected to a drain electrode of the first transistor, and a first capacitor having a first terminal electrically connected to the output of the device.

In accordance with various embodiments, a device includes a first transistor and a second transistor. The first transistor and the second transistor configured to compare an output voltage and a reference voltage. A third transistor is configured to mirror a current of the first transistor. A fourth transistor is electrically connected to the second transistor. A fifth transistor is configured to mirror a current of the fourth transistor. A sixth transistor is electrically connected to the fifth transistor. A seventh transistor is configured to mirror a current of the sixth transistor. An eighth transistor has a gate terminal electrically connected to the third transistor and the seventh transistor, and a drain terminal electrically connected to an output of the device. A first passive element has a first terminal electrically connected to the output of the device.

In accordance with various embodiments, a device includes an amplifier stage electrically connected to an output of the device and to a reference voltage. A current mirror is electrically connected to the amplifier stage. An auxiliary current source has a control terminal electrically connected to the current mirror. Also included is a pull down stage, including a first transistor having a gate terminal electrically connected to the amplifier stage, and a second transistor having a gate terminal electrically connected to the current mirror. A third transistor has a gate terminal electrically connected to the gate terminal of the first transistor. A fourth transistor has a gate terminal electrically connected to the auxiliary current source. A fifth transistor has a gate terminal electrically connected to a drain terminal of the third transistor. A pull up transistor has a gate terminal electrically connected to a drain electrode of the first transistor. A first passive element has a first terminal electrically connected to the output of the device. A second passive element has a first terminal electrically connected to the output of the device and a second terminal electrically connected to a gate terminal of the pull up transistor.

As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising". Moreover, the term "between" as used in this application is generally inclusive (e.g., "between A and B" includes inner edges of A and B).

Although the present embodiments and their advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A device comprising:
    an amplifier stage electrically connected to an output of the device and to a reference voltage;
    a current mirror electrically connected to the amplifier stage;
    an auxiliary current source having a gate terminal directly electrically connected to the current mirror and a drain terminal directly electrically connected to a plurality of transistors of the amplifier stage;
    a first stage including:
        a first transistor having a gate terminal electrically connected to the amplifier stage; and
        a second transistor having a gate terminal directly electrically connected to the current mirror and to the gate terminal of the auxiliary current source, the second transistor being directly electrically connected to a drain terminal of the first transistor;
    a pull up transistor having a gate terminal electrically connected to a drain electrode of the first transistor; and
    a first capacitor having a first terminal electrically connected to the output of the device.

2. The device according to claim 1, further comprising a diode connected transistor electrically connected to the output of the device.

3. The device according to claim 1, wherein the amplifier stage comprises:
a third transistor, a gate terminal of the third transistor electrically connected to the output of the device; and
a fourth transistor, a gate terminal of the fourth transistor being electrically connected to the reference voltage.

4. The device according to claim 3, wherein the amplifier stage further comprises:
a fifth transistor, wherein the current mirror is electrically connected to a gate terminal and a drain terminal of the fifth transistor; and
a sixth transistor, wherein the sixth transistor has a gate terminal and a drain terminal that is electrically connected to the first stage.

5. The device according to claim 1, wherein a source terminal of the auxiliary current source is electrically connected to the amplifier stage.

6. The device according to claim 1, wherein the current mirror comprises:
a seventh transistor, a gate terminal of the seventh transistor being electrically connected to the amplifier stage; and
an eighth transistor, a gate terminal of the eighth transistor being electrically connected to the auxiliary current source and the first stage.

7. The device according to claim 1, further comprising:
a bias current source; and
a ninth transistor electrically connected to the bias current source and electrically connected to the amplifier stage.

8. The device according to claim 1, wherein the amplifier stage further comprises a cross coupled pair of transistors.

9. The device according to claim 1, further comprising a second capacitor, a first terminal of the second capacitor being electrically connected to the output of the device and a second terminal of the second capacitor being electrically connected to the pull up transistor.

10. The device according to claim 9, wherein the first stage further comprises:
a tenth transistor, a gate terminal of the tenth transistor electrically connected to the gate terminal of the first transistor; and
an eleventh transistor, a gate terminal electrically connected to the auxiliary current source.

11. A device, comprising:
a first transistor and a second transistor, the first transistor and the second transistor configured to compare an output voltage and a reference voltage, a gate terminal of the first transistor being directly electrically connected to an output node of the device;
a third transistor configured to mirror a current of the first transistor;
a fourth transistor electrically connected to the second transistor;
a fifth transistor configured to mirror a current of the fourth transistor;
a sixth transistor electrically connected to the fifth transistor;
a seventh transistor configured to mirror a current of the sixth transistor;
an eighth transistor, a gate terminal of the eighth transistor electrically connected to the third transistor and the seventh transistor, and a drain terminal of the eighth transistor directly electrically connected to the output node of the device; and
a first passive element having a first terminal electrically connected to the output node of the device.

12. The device according to claim 11, further comprising:
a ninth transistor, a gate terminal of the ninth transistor being electrically connected to a gate terminal of the sixth transistor and a gate terminal of the seventh transistor.

13. The device according to claim 11, wherein the first passive element is a capacitor.

14. The device according to claim 11, where a gate terminal of the second transistor is electrically connected to a reference voltage.

15. The device according to claim 11, further comprising a diode circuit electrically connected to the output node of the device.

16. The device according to claim 11, further comprising a second passive element, a first terminal of the second passive element electrically connected to the output node of the device, and a second terminal of the second passive element electrically connected to the gate terminal of the eighth transistor.

17. The device according to claim 16, wherein the second passive element is a capacitor.

18. The device according to claim 16, further comprising a current source electrically connected to the output node of the device.

19. A device comprising:
an amplifier stage electrically connected to an output of the device and to a reference voltage;
a current mirror electrically connected to a first node of the amplifier stage, the first node being between a first amplifier stage transistor and a second amplifier stage transistor, the first amplifier stage transistor having a terminal that is directly electrically connected to a supply voltage;
an auxiliary current source having a gate terminal directly electrically connected to the current mirror;
a pull down stage including:
a first transistor having a gate terminal electrically connected to the amplifier stage; and
a second transistor having a gate terminal electrically connected to the current mirror;
a third transistor having a gate terminal electrically connected to the gate terminal of the first transistor;
a fourth transistor having a gate terminal electrically connected to the auxiliary current source, a drain terminal of the fourth transistor being directly electrically connected to a drain terminal of the third transistor; and
a fifth transistor having a gate terminal electrically connected to a drain terminal of the third transistor;
a pull up transistor having a gate terminal electrically connected to a drain electrode of the first transistor;
a first passive element having a first terminal electrically connected to the output of the device; and
a second passive element having a first terminal electrically connected to the output of the device and a second terminal electrically connected to a gate terminal of the pull up transistor.

20. The device according to claim 19, wherein the first passive element is a capacitor and the second passive element is a capacitor.

* * * * *